United States Patent Office 3,518,280
Patented June 30, 1970

---

3,518,280
1-p-CHLOROBENZOYL-2-METHYL-5-METHOXY-INDOLE-3-MALONIC ACID DERIVATIVES
John M. Chemerda, Watchung, and Meyer Sletzinger, North Plainfield, N.J., assignors to Merck & Co., Inc., Rahway, N.J., a corporation of New Jersey
No Drawing. Continuation-in-part of application Ser. No. 656,040, July 26, 1967. This application June 27, 1968, Ser. No. 740,453
Int. Cl. C07d 27/56
U.S. Cl. 260—326.13       3 Claims

ABSTRACT OF THE DISCLOSURE

A new method of preparing 1-p-chlorobenzoyl-2-methyl-3-indolylacetic acids by hydrolysis of 1-p-chlorobenzoyl-2-methyl-5-methoxyindole-3-malonate.

---

This application is a continuation-in-part of application Ser. No. 656,040, filed July 26, 1967, and now abandoned.

This invention relates to a new method of preparing certain 1-benzoyl-2-methyl-3-indolylacetic acid derivatives. More particularly, it relates to a method of preparing a 1-p-chlorobenzoyl-2-methyl-3-indolylacetic acid of the Formula I:

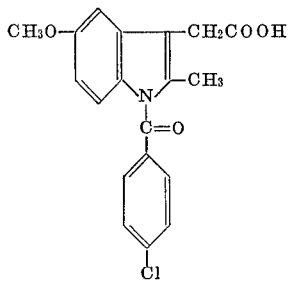

This compound is disclosed and claimed in U.S. Pat. 3,161,654, issued Dec. 15, 1964, to Shen. It relates further to the provision of intermediates which are useful in said method.

In the Shen patent, 1-p-chlorobenzoyl-2-methyl-3-indolylacetic acids are prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new method for obtaining this compound. It is a further object of this invention to provide new intermediates which are useful in said method. Other objects will become apparent hereinafter.

In accordance with this invention, it has been discovered that the 1-p-chlorobenzoyl-2-methyl-3-indolylacetic acid of Formula I can be prepared by the hydrolysis of a compound of the Formula II:

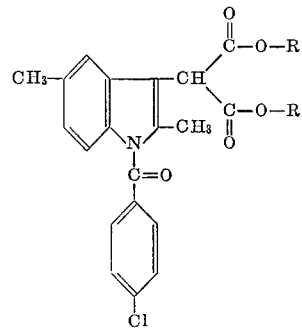

wherein R is either t-butyl or benzyl.

The process of the present invention may be carried out using any hydrolysis reagent which is capable of removing one carboxyl group and de-esterifying the other at the 3-position without removing the chloro substituent on the 1-benzoyl group. Suitable for this purpose are sulfuric or methane-sulfonic acids. The preferred catalyst is p-toluenesulfonic acid. The hydrolysis reaction can be effected at a temperature of up to 150° C. It is preferred, however, to conduct the reaction at a temperature in the range of 0–10° C.

The starting material for the process of the present invention is prepared by the reaction of a phenylhydrazine hydrochloride and 2-acetonylmalonic acid dibenzyl ester or, alternatively, the di-tertiarybutyl ester. The condensation of the hydrazine and the ester yields the diester of 2-methylindole-3-malonic acid of the Formula III:

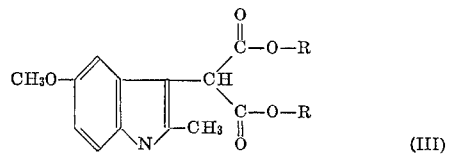

wherein the R symbols are as above defined. The compounds of Formula III are 1-p-chlorobenzoylated to yield the compounds of Formula II.

The following examples are presented to further illustrate the present invention.

EXAMPLE 1

A. A mixture of 10.0 g. of p-methoxyphenylhydrazine hydrochloride and 10.0 g. of 2-acetonylmalonic acid di-t-butyl ester in 100 ml. of t-butanol is refluxed for 5 hours. The t-butanol is distilled in vacuo and the residue partially dissolved in chloroform. The chloroform solution is washed with water, dried, and concentrated to give di-t-butyl 2-methyl-5-methoxyindole-3-malonate.

B. A solution of 5.0 g. of di-t-butyl 2-methyl-5-methoxyindole-3-malonate in 100 ml. dimethylformamide is added to a slurry of 10% excess sodium hydride dimethylformamide. The mixture is stirred at 0–5° C. until hydrogen evolution ceases. A 10% molar excess of p-chlorobenzoyl chloride is then slowly added. The mixture is stirred for an additional hour and the excess sodium hydride quenched with water. The mixture is diluted with a large volume of water and extracted with chloroform. The chloroform solution is dried, washed with water, and concentrated to give di-t-butyl 1-p-chlorobenzoyl-2-methyl-5-methoxyindole-3-malonate.

EXAMPLE 2

(A) A mixture of 10.0 g. of p-methoxyphenylhydrazine hydrochloride and 12.0 g. of 2-acetonylmalonic acid di-benzyl ester in 100 ml. of t-butanol is refluxed for 5 hours. The t-butanol is distilled in vacuo and the residue partially dissolved in chloroform. The chloroform solution is washed with water, dried, and concentrated to give di-benzyl 2-methyl-5-methoxyindole-3-malonate.

(B) Following the procedure of Example 1, except for the substitution of the benzyl ester for the ester used therein, there is obtained di-benzyl 1-p-chlorobenzoyl-2-methyl-5-methoxyindole-3-malonate.

EXAMPLE 3

Di-t-butyl 1-p-chlorobenzoyl-2-methyl-5-methoxyindole-3-malonate (5.0 g.) in 100 ml. toluene is refluxed in the presence of 1.0 g. p-toluenesulfonic acid until isobutylene ceases to be evolved. The solution is washed with water and concentrated to give crude 1-p-chlorobenzoyl-2-methyl-5-methoxy-3-indolylacetic acid. Recrystallization from t-butanol gives substantially pure 1-p-chlorobenzoyl-2-methyl-5-methoxy-3-indolylacetic acid.

The foregoing reaction can be equivalently effected using methane sulfonic acid in place of the reagent used therein.

EXAMPLE 4

Di-benzyl 1-p-chlorobenzoyl-2-methyl-5-methoxyindole-3-malonate (5.0 g.) is heated in acetic acid at 100° C. in the presence of 100 mg. of p-toluenesulfonic acid until the presence of the di-benzyl ester can no longer be detected as the mobile spot by thin-layer chromatography on silica gel using the solvent system, benzene-methanol-acetic acid (40:10:1). The solution is concentrated to dryness in vacuo and the residue crystallized from t-butanol to give substantially pure 1-p-chlorobenzoyl-2-methoxy-3-indolylacetic acid.

EXAMPLE 5

Di-benzyl 1-p-chlorobenzoyl-2-methyl-5-methoxyindole-3-malonate (5.0 g.) is dissolved in 100 ml. of acetic acid containing 1 molar equivalent of hydrogen chloride and hydrogenolyzed using a 5% Pd–C catalyst until the uptake of hydrogen stops. The catalyst is removed by filtration and the solution heated (30–118° C.) until the evolution of carbon dioxide ceases. The solution is concentrated in vacuo and the residue crystallized from t-butanol to give pure 1-p-chlorobenzoyl-2-methyl-5-methoxy-3-indolylacetic acid.

We claim:
1. A compound of the formula:

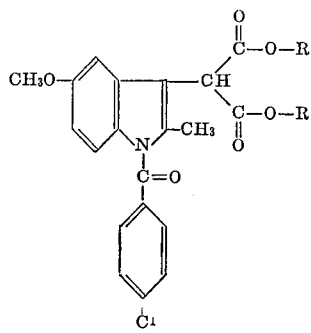

wherein R is either benzyl or t-butyl.
2. The compound of claim 1 wherein R is t-butyl.
3. The compound of claim 1 wherein R is benzyl.

References Cited
UNITED STATES PATENTS 3,342,834   9/1967   Shen _____ 260—326.12

ALEX MAZEL, Primary Examiner
J. A. NARCAVAGE, Assistant Examiner

UNITED STATES PATENT OFFICE
CERTIFICATE OF CORRECTION

Patent No. 3,518,280  Dated June 30, 1970

Inventor(s) John M. Chemerda and Meyer Sletzinger

It is certified that error appears in the above-identified patent and that said Letters Patent are hereby corrected as shown below:

Column 2, Formula III, that portion of the formula reading

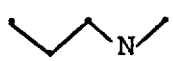   should read   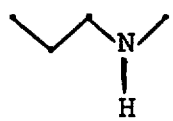

SIGNED AND SEALED
OCT 6 - 1970

(SEAL)
Attest:

Edward M. Fletcher, Jr.
Attesting Officer

WILLIAM E. SCHUYLER, JR.
Commissioner of Patents